US009425867B2

(12) United States Patent
Shi et al.

(10) Patent No.: US 9,425,867 B2
(45) Date of Patent: Aug. 23, 2016

(54) PRE-PROCESSING METHOD, SYSTEM, AND APPARATUS FOR COOPERATIVE COMMUNICATION

(75) Inventors: Guangyu Shi, Cupertino, CA (US); Hongbo Zhang, Shenzhen (CN); Xun Yang, Shenzhen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 13/253,254

(22) Filed: Oct. 5, 2011

(65) Prior Publication Data

US 2012/0028666 A1 Feb. 2, 2012

Related U.S. Application Data

(63) Continuation of application No. PCT/CN2010/075273, filed on Jul. 20, 2010.

(30) Foreign Application Priority Data

Jul. 20, 2009 (CN) .......................... 2009 1 0161316

(51) Int. Cl.
*H04B 7/02* (2006.01)
*H04L 25/03* (2006.01)
*H04L 25/02* (2006.01)

(52) U.S. Cl.
CPC .......... *H04B 7/022* (2013.01); *H04L 25/03904* (2013.01); *H04L 25/0206* (2013.01)

(58) Field of Classification Search
CPC ............................................... H04W 28/0236
USPC .......... 370/310–350, 395.4–395.43; 455/403, 455/422.1
See application file for complete search history.

(56) References Cited

U.S. PATENT DOCUMENTS

2007/0183380 A1* 8/2007 Rensburg et al. ............. 370/338
2007/0230605 A1* 10/2007 Osseiran et al. .............. 375/260
(Continued)

FOREIGN PATENT DOCUMENTS

CN 101373998 A 2/2009
CN 101478342 A 7/2009
(Continued)

OTHER PUBLICATIONS

PCT publication and International search report for International application No. PCT/CN2010/075273, dated Oct. 28, 2010, total 33 pages.
(Continued)

*Primary Examiner* — Hassan Kizou
*Assistant Examiner* — Ashil Farahmand
(74) *Attorney, Agent, or Firm* — Conley Rose, P.C.; Grant Rodolph; Nicholas K. Beaulieu

(57) ABSTRACT

A pre-processing method and system for cooperative communication are provided. The method includes: after obtaining channel matrices collected by a Base Station (BS), obtaining Multiple-Input Multiple-Output (MIMO) Cooperation Area (CA) information, in which the MIMO CA information includes cooperation information between BSs, and the cooperation information between the BSs is used to determine an interference relation between MIMO CAs; combining the channel matrices of a User Equipment (UE) according to the interference relation between the MIMO CAs; and performing pre-coding computation of the UE by using the combined channel matrices.

14 Claims, 5 Drawing Sheets

(56) References Cited

U.S. PATENT DOCUMENTS

2009/0117911 A1    5/2009  Molisch et al.
2010/0035555 A1*   2/2010  Bala et al. .................... 455/63.1
2010/0048233 A1*   2/2010  Kim et al. .................... 455/501

FOREIGN PATENT DOCUMENTS

EP         1699145 A2    9/2006
WO      2009084905 A2    7/2009

OTHER PUBLICATIONS

3GPP TSG RAN WG1 Meeting #57bis,R1-092842,CEWiT, "Downlink CoMP Based on Cooperative Precoding", Los Angeles, USA, Jun. 29-Jul. 3, 2009, total 5 pages.

Written Opinion issued in corresponding PCT application No. PCT/CN2010/075273, dated Oct. 28, 2010, total 5 pages.

Search report issued in corresponding European patent application No. EP10801953.0 , dated May 7, 2012 , total 11 pages.

Mitsubishi Electric, "Leakage-based precoding for CoMP in LTE-A," 3GPP Draft; R1-090596, Athens,Greece; Feb. 3, 2009, 14 pages total.

CMCC, "Downlink CoMP-MU-MIMO transmission Schemes," 3GPP Draft; R1-090922, Athens,Greece; Feb. 6, 2009, 8 pages total.

Foreign Communication From a Counterpart Application, Chinese Application No. 200910161316.8, Chinese Office Action dated Mar. 13, 2013, 7 pages.

Foreign Communication From a Counterpart Application, Chinese Application No. 200910161316.8, Chinese Office Action dated Mar. 13, 2013, 6 pages.

First office action issued in corresponding Chinese patent application No. 200910161316.8, dated Aug. 1, 2012, and English translation thereof, total 12 pages.

* cited by examiner

PRE-PROCESSING METHOD, SYSTEM, AND APPARATUS FOR COOPERATIVE COMMUNICATION

CROSS-REFERENCE TO RELATED APPLICATIONS

This application is a continuation of International Application No. PCT/CN2010/075273, filed on Jul. 20, 2010, which claims priority to Chinese Patent Application No. 200910161316.8, filed on Jul. 20, 2009, both of which are hereby incorporated by reference in their entireties.

FIELD OF THE INVENTION

The present invention relates to the field of mobile communications technologies, and in particular, to a pre-processing method, system, and an apparatus for cooperative communication.

BACKGROUND OF THE INVENTION

With the rapid development of mobile communications technologies, Coordinated Multiple Point (CoMP) technology is considered as one of the most promising core technologies in Long Time Evolution-Advanced (LTE-A) technology. Cooperative-Multiple-Input Multiple-Out-put (Co-MIMO), as a typical scenario of the CoMP, has a basic aim of providing services to one or more User Equipments (UEs) through cooperative processing between multiple Base Stations (BSs), so as to effectively eliminate inter-cell interference, and enhance a throughput of cell-edge users and an average cell throughput.

In performing the Co-MIMO, a basic task is determining how to rotationally divide the BSs, so as to form different Cooperation Areas (CAs), and therefore to obtain the best system performances. In view of the task, currently proposed CA division methods substantially include the following several methods, which may be divided into two main types with or without overlaps of the CAs. Typical methods without overlaps of the CAs include, for example, network-centric, network defined and UE-assisted, and typical method with overlaps of the CAs includes, for example, UE-centric.

As for the two types of methods, in the type without overlaps between the CAs, interference influences between the CAs are omitted. Due to the absence of correlation between the CAs, scheduling computation is only performed between the BSs in the CA, and computation tasks between different CAs may be performed in parallel. This solution may effectively eliminate the interference between the BSs in each CA. However, as in this type of methods, mutual interference of edge areas in joint parts of different CAs is not considered, poor user experience is caused in those areas, inter-cell interference exists in large quantity at the same time, and throughput gain that may be obtained by the system is limited.

The type of methods with overlaps of the CAs may effectively avoid the occurrence of the foregoing problem. As overlaps between the CAs are considered in this type of methods, coupling exists between the CAs. Therefore, a scheduling process requires cooperation of all overlapped CAs, and the cooperation is finally extended to the whole network. In a scheduling process of the system, scheduling between all BSs in the system needs to be considered. In the scheduling computation, both intra-CA interference and inter-CA interference are considered, so a good throughput gain may be obtained. However, as in this type of methods, all overlapped CAs are scheduled as a whole, and an ultimate case of such a scheduling is the scheduling of the whole network, the scheduling process is very complex, so that a practical application is very difficult to be achieved.

SUMMARY OF THE INVENTION

In view of this, embodiments of the present invention provide a pre-processing method, system, and an apparatus for cooperative communication, so as to reduce the complexity of a computation process while eliminating inter-UE inference of a cell. The embodiments of the present invention are implemented as follows.

An embodiment of the present invention provides a pre-processing method for cooperative communication, where the method includes: obtaining MIMO CA information, in which the MIMO CA information includes cooperation information between BSs, and the cooperation information between the BSs is used to determine an interference relation between MIMO CAs; combining channel matrices of a UE according to the interference relation between the MIMO CAs; and performing pre-coding computation of the UE by using the combined channel matrices.

An embodiment of the present invention provides a pre-processing method for cooperative communication, where the method includes: receiving channel matrices collected by all BSs serving a certain UE; and performing pre-coding computation of the UE by using the channel matrices collected by all the BSs serving a certain UE.

An embodiment of the present invention provides a pre-processing system for cooperative communication, where the system includes a task decomposition and scheduling apparatus and a computation device.

The task decomposition and scheduling apparatus is configured to obtain MIMO CA information, and combine channel matrices of a UE according to an interference relation between MIMO CAs, in which the MIMO CA information includes cooperation information between BSs, and the cooperation information between the BSs is used to determine an interference relation between MIMO CAs.

The computation device is configured to perform pre-coding computation of the UE by using the combined channel matrices, according to the scheduling by the task decomposition and scheduling apparatus.

An embodiment of the present invention provides a task decomposition and scheduling apparatus, where the apparatus includes: an obtaining unit, configured to obtain MIMO CA information, in which the MIMO CA information includes cooperation information between BSs, and the cooperation information between the BSs is used to determine an interference relation between MIMO CAs; a task decomposition unit, configured to combine channel matrices of a UE according to the interference relation between the MIMO CAs; and a task scheduling unit, configured to schedule a computation device and perform pre-coding computation of the UE by using the combined channel matrices.

An embodiment of the present invention provides a computation device, where the device includes: a receiving unit, configured to receive channel matrices collected by all BSs serving a certain UE; and a computation unit, configured to perform pre-coding computation of the UE by using the channel matrices collected by all the BSs serving a certain UE.

In the technical solutions according to the embodiments of the present invention, the channel matrices of the UE are combined according to the interference relation between the MIMO CAs, and the pre-coding computation of the UE is performed by using the combined channel matrices, so as to eliminate inter-UE interference, and correspondingly reduce the complexity of the pre-coding computation process for eliminating the inter-UE interference.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

DETAILED DESCRIPTION OF THE EMBODIMENTS

The technical solution of the present invention is clearly and completely described in the following with reference to the accompanying drawings in the embodiments of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
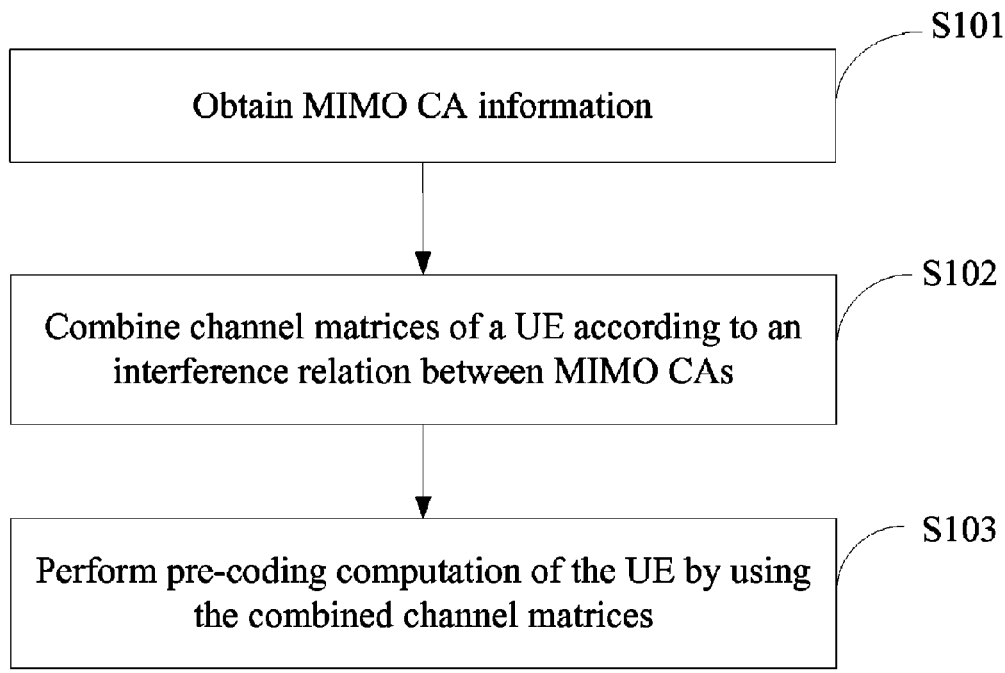
FIG. 1 is a flow chart of a pre-processing method for cooperative communication according to an embodiment of the present invention.

An embodiment of the present invention provides a pre-processing method for cooperative communication, and specific steps of the method are as shown in FIG. 1.

S101: Obtain MIMO CA information. It may be understood in this embodiment that, the CA information may be cooperation information between BSs and a corresponding relation between a BS and a UE, and this step may be understood as obtaining of information of BSs forming an MIMO CA, that is, the number of the BSs in the MIMO CA, or BSs that form the MIMO CA, and a corresponding relation between the BS and the UE served by the BS. The corresponding relations between the BSs and the UEs may be understood as which UEs are served by a BS. The cooperation information between the BSs is used to determine an inter-ference relation between MIMO CAs.

S102: Combine channel matrices of a UE according to an interference relation between MIMO CAs. This step may be understood as dividing of computation task according to the interference relation between MIMO CAs. Herein, the interference relation refers to that a UE in a certain CA receives signals sent by a BS to UEs in other CAs, while the UE in the CA receives a signal sent by the BS, and therefore an interference relation is formed between the CAs. Therefore, this step may be understood as that the channel matrices reported by a UE that has an interference relation are combined, and saved in a computation device corresponding to the UE. In this embodiment, the interference relation between the MIMO CAs is determined through the cooperation information between the BSs.

In this embodiment, as the channel matrices are reported by a UE for all BSs serving the UE, it should be understood that this step may further include the following steps.

Channel matrices sent by the BSs and reported by the UE served by the BSs are obtained. In this step, the BSs are scheduled to send the channel matrices reported by the UE served by the BSs.

Channel matrices collected by all the BSs serving a certain UE are combined. In this embodiment, according to a corresponding relation between a BS and a UE in the MIMO CAs, the channel matrices collected by all the BSs serving a certain UE are combined.

The combined channel matrices are sent to a corresponding computation device.

In this embodiment, the step may further include the following steps.

All BSs serving a certain UE are scheduled, and collected channel matrices are sent to a computation device and combined. In this embodiment, all the BSs serving a certain UE are scheduled according to the corresponding relation between the BS and the UE, in the MIMO CAs and the collected channel matrices are sent to the computation device. In this embodiment, all the BSs serving a certain UE send the collected channel matrices to the computation device, which means that the computation device collects, or combines the channel matrices sent by all the BSs serving a certain UE.

S103: Perform pre-coding computation of the UE by using the combined channel matrices. It may be understood that, a computation device corresponding to the UE is scheduled, so that the computation device performs pre-coding computation of the UE by using the saved combined channel matrices. Definitely, when the computation device finishes the pre-coding computation of the UE, the computation device is further needed to be scheduled to return a computation result to a corresponding BS.

In this embodiment, before performing the step S101, CA division in MIMO needs to be determined, that is, it is determined which BSs form the MIMO CA. An MIMO CA to which each UE belongs is also determined. Then, a BS in the MIMO CA collects the channel matrices reported by the UE served by the BS.

In the technical solution according to the embodiment of the present invention, channel matrices collected by all the BSs serving a certain UE are combined, and the pre-coding computation of the UE is performed by using the combined channel matrices, so that inter-UE interference is eliminated; when the pre-coding computation of each UE needs to be performed, because the channel matrices of each UE to be used are saved on different computation devices, decoupling of the computation task is achieved, and the complexity of the pre-coding computation process for eliminating inter-UE interference is correspondingly reduced by using distributed computation that has no correlation between each other.

Figure 2:
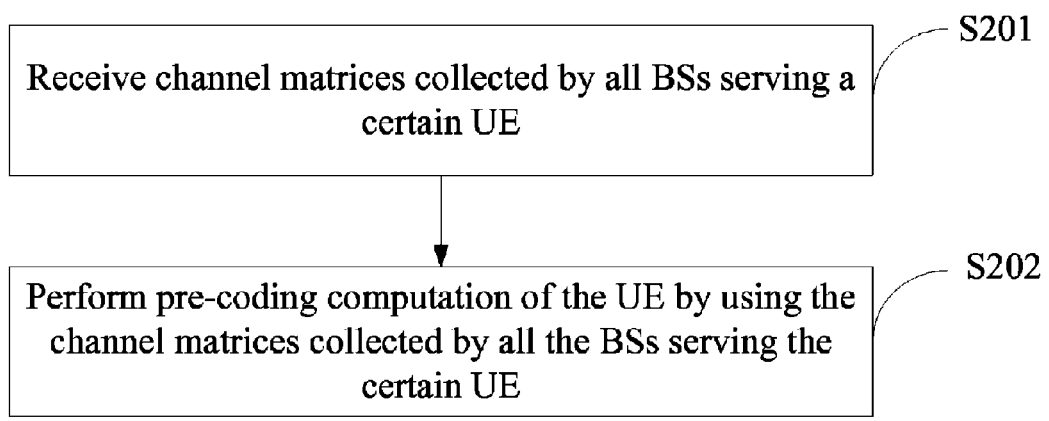
FIG. 2 is a flow chart of another pre-processing method for cooperative communication according to an embodiment of the present invention.

An embodiment of the present invention provides another pre-processing method for cooperative communication, and a specific process of the method is as shown in FIG. 2.

S201: Receive channel matrices collected by all BSs serving a certain UE.

In step S201, combined channel matrices sent by a task decomposition and scheduling apparatus may be received, in which the combined channel matrices are formed by combining the channel matrices collected by all the BSs serving a certain UE. In this embodiment, in step S201, the received combined channel matrices may be saved.

In this embodiment, step S201 may be receiving the channel matrices sent by all the BSs serving a certain UE.

S202: Perform pre-coding computation of the UE according to a scheduling instruction by using the channel matrices collected by all the BSs serving a certain UE.

The pre-coding computation of the UE is performed by using the combined channel matrices according to the scheduling of the task decomposition and scheduling apparatus. In this embodiment, the pre-coding computation of the UE is performed by using the combined channel matrices according to the scheduling instruction of the task decomposition and scheduling apparatus.

In the technical solution according to the embodiment of the present invention, the channel matrices collected by all the BSs serving a certain UE are received, and the pre-coding computation of the UE is performed by using the channel matrices collected by all the BSs serving the same UE, so that inter-UE interference is eliminated.

Figure 3:
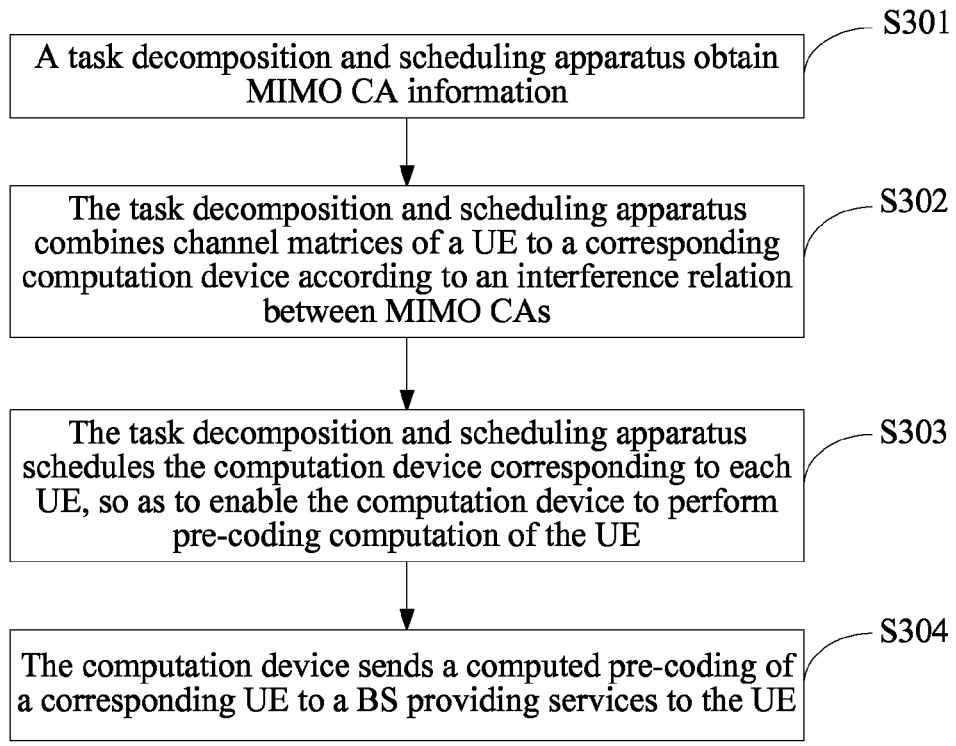
FIG. 3 is a flow chart of a third pre-processing method for cooperative communication according to an embodiment of the present invention.

An embodiment of the present invention provides a third method for eliminating inter-UE interference, and a specific process of the method is as shown in FIG. 3.

S301: A task decomposition and scheduling apparatus obtains MIMO CA information.

S302: The task decomposition and scheduling apparatus combines channel matrices of a UE to a corresponding computation device according to an interference relation between MIMO CAs. In this embodiment, in a first manner, the channel matrices sent by a BS and reported by the UE served by the BS may be obtained first; and the channel matrices collected on all BSs serving a certain UE are combined, and the combined channel matrices are saved in a corresponding computation device. In a second manner, all the BSs serving a certain UE are scheduled, and the collected channel matrices are sent to the computation device and combined.

In this embodiment, step S302 is a critical step for achieving elimination of inter-UE interference. In a network, in order to prevent a certain UE from interference of other UEs, a condition should be met, that a product of channel matrices of the UE and pre-coding matrices of other UEs served by BSs providing services for the UE is 0. Before a BS sends data to a corresponding UE, a pre-coding matrix of the UE is multiplied by the data to be sent, and therefore, interference caused by other UEs to the UE may be reduced or eliminated. According to this condition, pre-coding computation of each UE may be performed according to relevant channel matrices, so as to achieve the elimination of inter-UE interference in the network. Therefore, it may be known that, performing of pre-coding computation of a UE requires relevant channel matrices as an input condition, and the problem that how to achieve distributed parallel computation in performing pre-coding computation of each UE, and make little or no coupling exist between different computation tasks may be solved by a method as described in step S302, which may specifically include the following.

A UE in a network reports to all BSs serving the UE channel matrices therebetween. After a BS receive the channel matrices reported by the UE served by the BS, a task decomposition and scheduling apparatus obtains the collected channel matrices from the BS, combines the collected channel matrices, or schedules all the BSs serving a certain UE, and sends the collected channel matrices to a computation device for combination, following a combination principle in which the channel matrices collected by all the BSs serving a certain UE are combined. The principle may be further specifically as follows. It is assumed that a certain UE has two BSs providing services thereto, all the channel matrices collected on the two BSs are combined and then saved in one computation device; and if a certain UE has only one BS providing services thereto, all the channel matrices collected by the BS are saved in one computation device, which may be considered as a special manner for combining and saving the channel matrices. It may be known from the above manners that, the channel matrices required for computing different UEs have been saved on different computation devices, so that in pre-coding computation of a certain UE in a network, only a corresponding computation device needs to be revoked, and the revoked computation device may perform the pre-coding computation of the UE according to the channel matrices required for computing the UE saved therein, which eliminates the correlation degree in a computation process, so that the pre-coding computation of the UE in the network may be completed through distributed parallel computation, thereby the complexity in the computation process is reduced.

It should be noted that, the computation devices that save the combined channel matrices may be further correspondingly sorted, for example, based on the number of the BSs corresponding to the channel matrices saved on a computation device. If several computation devices respectively save the channel matrices of two BSs thereon, the several computation devices are classified into one type, which is beneficial to scheduling of relevant computation devices in subsequent computation.

S303: The task decomposition and scheduling apparatus schedules a computation device corresponding to each UE, so as to enable the computation device to perform pre-coding computation of the UE.

In step S302, decoupling of each UE in the pre-coding computation is achieved, so that in performing the pre-coding computation of the UE in a network, the task decomposition and scheduling apparatus only needs to invoke the computation device corresponding to the UE, and the invoked computation device computes pre-coding of the corresponding UE by using the channel matrices of the corresponding UE saved therein, and according to the principle that the product of the channel matrices and the pre-coding matrix to be solved is 0. In this way, parallel computation of pre-coding of different UEs in the network on multiple computation devices may be achieved.

It should be noted that, in performing pre-coding computation of each UE, a manner may be employed, in which if the combined channel matrices saved on a computation device may be used for pre-coding computation of multiple UEs, the computation device may compute a common solution space of the pre-coding of the multiple UEs, and then respectively perform the pre-coding computation of each UE according to the obtained common solution space. As a result, the workload in a computation process may be effectively reduced.

S304: A computation device sends a computed pre-coding of a corresponding UE to a BS providing services to the UE.

In step S304, after completing the pre-coding computation of the relevant UE, the computation device needs to send the pre-coding to the BS providing services to the corresponding UE, so as to achieve elimination of inter-UE interference while the BS in the network send data information to the corresponding UE.

In the technical solution according to the embodiment of the present invention, the channel matrices collected on all BSs serving the same UE are combined, and the pre-coding computation of the UE is performed by using the combined channel matrices, so that the inter-UE interference is eliminated. When the pre-coding computation of each UE needs to be performed, the channel matrices of each UE to be used are saved on different computation devices, so the decoupling of the computation task is achieved, which is beneficial to achieving a distributed computation with no correlation between each other, and the complexity of the pre-coding computation process for achieving the elimination of inter-UE interference is correspondingly reduced.

Figure 4:
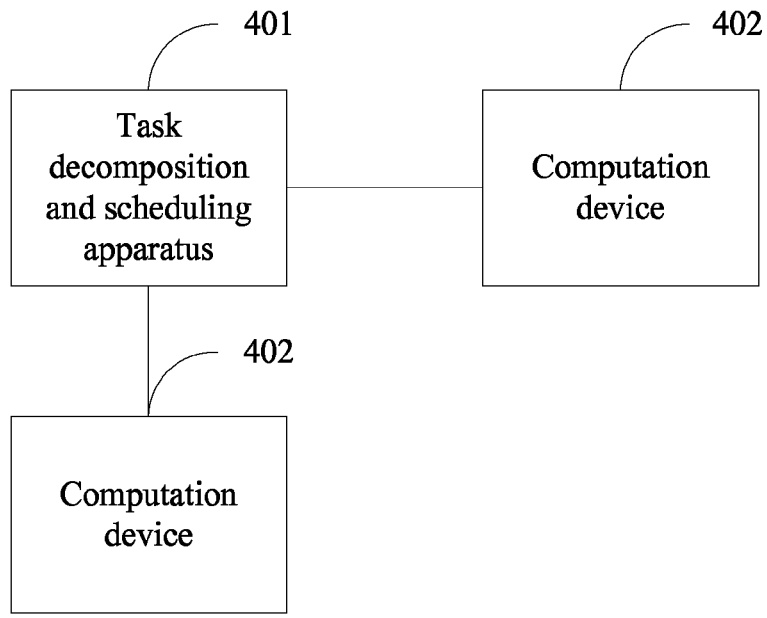
FIG. 4 is a schematic structural view of a pre-processing system for cooperative communication according to an embodiment of the present invention.

Correspondingly, an embodiment of the present invention further provides a pre-processing system for cooperative communication, which includes, as shown in FIG. 4, a task decomposition and scheduling apparatus 401 and computation devices 402, in which the number of the computation devices 402 is dependent on a specific situation of a network. Main functions of the apparatuses are as follows.

The task decomposition and scheduling apparatus 401 is configured to obtain MIMO CAs, and combine channel matrices of a UE to a corresponding computation device according to an interference relation between the MIMO CAs, and schedule the computation device. In this embodiment, the task decomposition and scheduling apparatus 401 is further configured to combine channel matrices collected by all BSs serving a certain UE and save the combined channel matrices on a corresponding computation device, when interference exists between the MIMO CAs; and schedule the computation device corresponding to the UE, so as to enable the computation device to perform pre-coding computation of the UE by using the saved combined channel matrices.

In this embodiment, the task decomposition and scheduling apparatus 401 is further configured to obtain channel matrices sent by a BS and reported by a UE served by the BS, combine the channel matrices collected on all BSs serving a certain UE, and send the combined channel matrices to a corresponding computation device 402. Alternatively, the task decomposition and scheduling apparatus 401 is further configured to schedule all the BSs serving a certain UE, and send collected channel matrices to the computation device 402 for combination.

The computation device 402 is configured to perform the pre-coding computation of the UE by using the combined channel matrices, according to the scheduling of the task decomposition and scheduling apparatus. In this embodiment, the computation device 402 is further configured to send the computed pre-coding of the corresponding UE to the BS proving services for the UE, under the scheduling of the task decomposition and scheduling apparatus.

In the technical solution according to the embodiment of the present invention, the channel matrices collected on all the BSs serving a certain UE are combined, and the pre-coding computation of the UE is performed by using the combined channel matrices, so as to eliminate the inter-UE interference. When the pre-coding computation of each UE needs to be performed, the channel matrices of each UE to be used are saved on different computation devices, so decoupling of the computation task is achieved, which is beneficial to achieving a distributed computation that has no correlation between each other, and the complexity of the pre-coding computation process for achieving elimination of inter-UE interference is correspondingly reduced.

Figure 5:
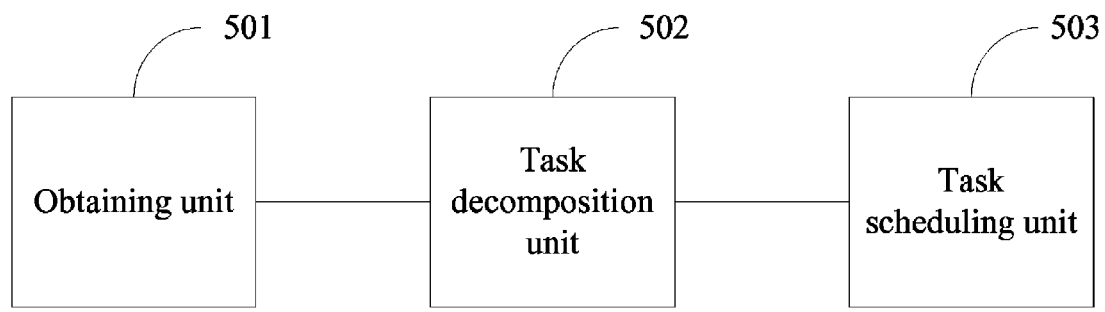
FIG. 5 is a schematic structural view of a task decomposition and scheduling apparatus according to an embodiment of the present invention.

In addition, an embodiment of the present invention further provides a task decomposition and scheduling apparatus, which has a structure as shown in FIG. 5, and includes an obtaining unit 501, a task decomposition unit 502, and a task scheduling unit 503.

The obtaining unit 501 is configured to obtain MIMO CA information. In this embodiment, the obtaining unit 501 is further configured to obtain channel matrices sent by a BS and reported by a UE served by the BS.

The task decomposition unit 502 is configured to combine the channel matrices of the UE to a corresponding computation device according to an interference relation between MIMO CAs. In this embodiment, the task decomposition unit 502 is further configured to combine channel matrices collected on all BSs serving a certain UE to a corresponding computation device when interference exists between the MIMO CAs.

In this embodiment, the task decomposition unit 502 is further configured to combine the channel matrices collected on all the BSs serving a certain UE according to the channel matrices obtained by the obtaining unit 501, when interference exists between the MIMO CAs, and send the combined channel matrices to a corresponding computation device.

The task scheduling unit 503 is configured to schedule a computation device corresponding to the UE, so as to enable the computation device to perform pre-coding computation of the UE by using the combined channel matrices.

In this embodiment, the task decomposition unit 502 is further configured to notify the task scheduling unit 503 to schedule all the BSs serving a certain UE according to a corresponding relation between a BS of the MIMO CAs and a UE, when interference exists between the MIMO CAs, and send the collected channel matrices to the computation device for combination.

In this embodiment, the task scheduling unit 503 is further configured to schedule all the BSs serving a certain UE, and send the collected channel matrices to the computation device for combination. In this embodiment, according to the corresponding relation between the BS of the MIMO CAs and the UE, all the BSs serving the same UE are scheduled, and the collected channel matrices are sent to the computation device, and combined on the computation device.

In this embodiment, the task scheduling unit 503 is further configured to schedule a BS to send the channel matrices collected by the BS and reported by all UEs served by the BS to the computation devices. The task scheduling unit 503 is further configured to schedule the computation device to return a computation result to the BS providing services to the UE after the computation device completes the pre-coding computation of the UE.

In a practical application, the task decomposition and scheduling apparatus may exist in a network as a separate entity; in addition, the task decomposition and scheduling apparatus may be further deployed on a certain BS or several BSs through multiple manners. Whichever deploy manner is used, the function of the task decomposition and scheduling apparatus remains unchanged.

Figure 6:
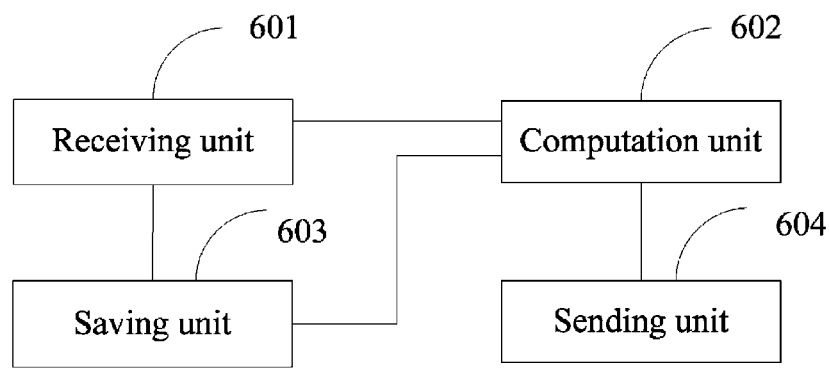
FIG. 6 is a schematic structural view of a computation device according to an embodiment of the present invention.

In addition, an embodiment of the present invention further provides a computation device, which has a structure as shown in FIG. 6, and includes a receiving unit 601, a computation unit 602, and a saving unit 603.

The receiving unit 601 is configured to receive channel matrices collected by all BSs serving a certain UE. In this embodiment, the receiving unit 601 may be configured to receive combined channel matrices sent by a task decomposition and scheduling apparatus, in which the combined channel matrices are formed by combining the channel matrices collected by all the BSs serving a certain UE.

The computation unit 602 is configured to perform pre-coding computation of the UE by using the combined channel matrices according to the scheduling of the task decomposition and scheduling apparatus.

The saving unit 603 is configured to save the combined channel matrices received by the receiving unit 601. In this embodiment, the computation unit 602 may perform the pre-coding computation of the UE by using the combined channel matrices received by the receiving unit 601, or perform the pre-coding computation of the UE by using the combined channel matrices received by the saving unit 603.

Depending on a practical situation, the computation device according to the embodiment may further include a sending unit 604, which is configured to send a computed pre-coding of the corresponding UE to a BS proving services for the UE according to the scheduling of the task decomposition and scheduling apparatus.

In this embodiment, the receiving unit 601 is further configured to receive the channel matrices sent by all the BSs serving a certain UE. In this case, the computation unit 602 is further configured to perform the pre-coding computation of the UE according to the channel matrices received by the receiving unit 601 and sent by all the BSs serving the UE.

Correspondingly, the computation device may be deployed on a Peer to Peer (P2P) computation system formed by BSs, and in order to achieve the function of distributed computation, the BSs having computation devices deployed may be connected in a P2P manner. In addition, the computation device exists in a network as a separate system. Whichever deploy manner is used, the function of the task decomposition and scheduling apparatus remains unchanged. In this embodiment, the task decomposition and scheduling apparatus and the computation device may be integrated into one device.

Figure 7:
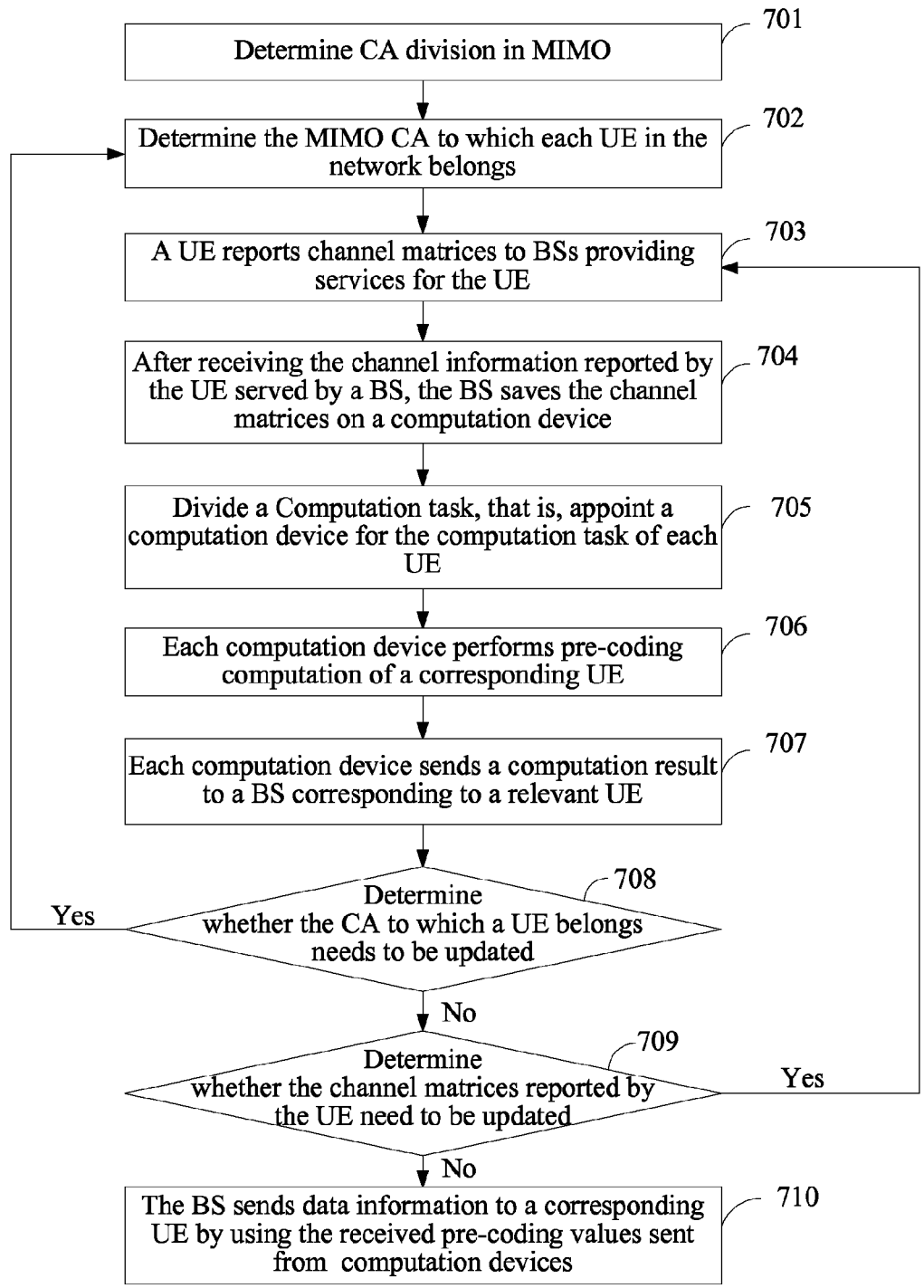
FIG. 7 is a flow chart of a fourth pre-processing method for cooperative communication according to an embodiment of the present invention.

The technical solution of the present invention is further described with reference to the foregoing methods and specific application scenario, and specific steps are as shown in FIG. 7.

Step 701: Determine CA division in MIMO.

In step 701, how to divide CAs in MIMO may be determined by a UE according to channel quality, or determined by an MIMO network according to network conditions and/or UE recommendations. In dividing MIMO CAs in this embodiment, overlap between different CAs is permitted.

Step 702: Determine the MIMO CA to which each UE in the network belongs.

In step 702, after CA division is completed, the MIMO CA to which each UE in the network belongs needs to be determined, and the determination may be performed by a UE according to the channel quality, or according to the MIMO network conditions and/or UE recommendations.

Step 703: A UE reports channel matrices to BSs providing services for the UE.

Figure 8:
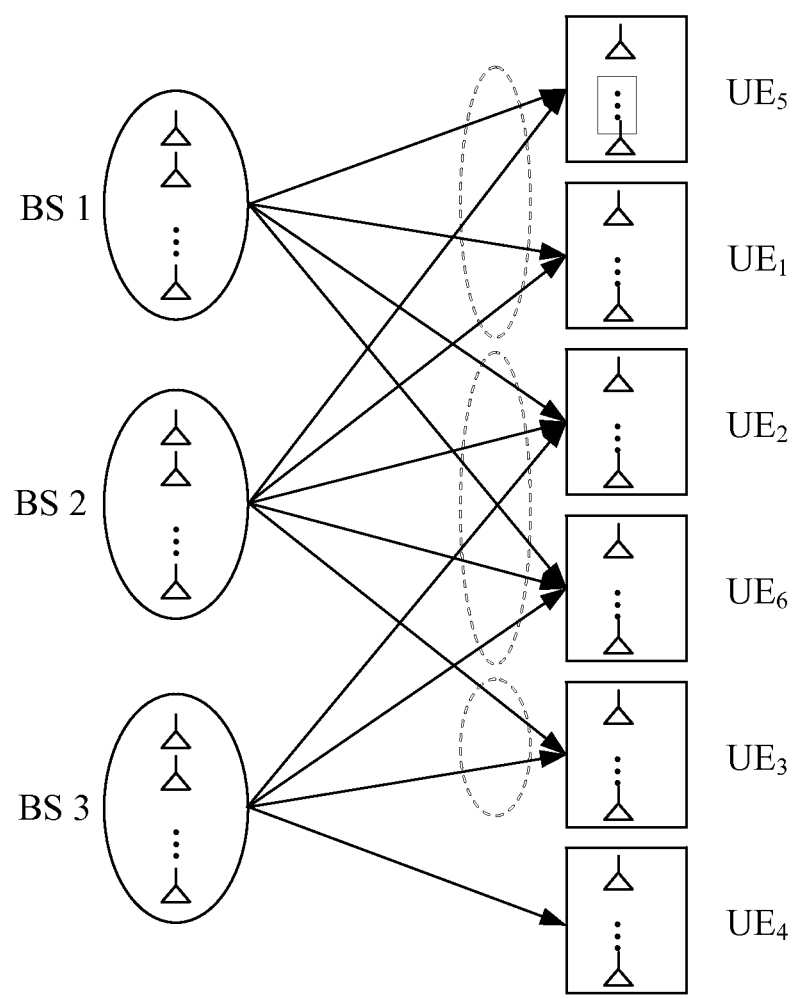
FIG. 8 is a schematic view of a network scenario according to an embodiment of the present invention.

In step 703, each UE needs to report channel matrices to all BSs providing services for the UE, if a certain UE has only one BS providing services to the UE, the UE only needs to report a channel matrix to one BS, in which the channel matrix refers to a channel matrix between the UE and the BS providing services for the UE; and if a certain UE has multiple BSs providing services for the UE, the UE needs to report a corresponding channel matrix to each BS providing services for the UE, as shown in an example of FIG. 8. FIG. 8 is a schematic view of the corresponding relations between UEs and BSs. It may be known from FIG. 8 that, a $UE_1$ has a BS 1 and a BS 2 providing services thereto, and the $UE_1$ needs to report a channel matrix between the $UE_1$ and the BS 1 to the BS 1, and report a channel matrix between the $UE_1$ and the BS 2 to the BS 2.

Step 704: after receiving the channel matrices reported by the UE served by a BS, the BS saves the channel matrices on a computation device.

In this embodiment, after a BS collects the channel matrices reported by the UE served by the BS, the BS sends the collected channel matrices to a computation device for being saved, under the scheduling of a task decomposition and scheduling apparatus.

In step 704, after receiving the channel matrices reported by the UE served by a BS, each BS collects the channel matrices, and saves the channel matrices on a corresponding computation device, and in this embodiment, it is assumed that the computation device is located on Level 1. If a certain UE has two BSs proving services for the UE, all channel matrices collected by the two BSs are combined and saved on a new computation device, and in this embodiment, it is assumed that the computation device is located on Level 2. With reference to the example in FIG. 8, as a $UE_1$ has a BS 1 and a BS 2 providing services thereto, the BS 1 and the BS 2 combine and save all the collected channel matrices on a certain computation device, and this device is located on Level 2. If a certain UE has n BSs providing services thereto, the n BSs combine and save all the collected channel matrices on a certain computation device, and in this embodiment, it is assumed that the computation device is located on Level n. It should be noted that, Level 1, Level 2 and so on herein have no difference in level, but represent a sort of the channel matrices collected by different number of BSs.

Step 705: Divide a computation task, that is, appoint a computation device for the computation task of each UE.

In this embodiment, MIMO CA information needs to be obtained first. This step may be understood as obtaining information of BSs that form an MIMO CA, that is, the number of the BSs in the MIMO CA, or BSs that form the MIMO CA. Definitely, multiple MIMO CAs need to be obtained in this step. Then, the computation task is divided according to an interference relation between the MIMO CAs.

In step 705, in dividing the computation task, the computation task is divided according to the interference relation between the MIMO CAs in this embodiment, and the interference relation herein refers to that a UE in a certain CA receives signals sent by a BS to a UE in other CAs, while the UE in the CA receives a signal sent by the BS, and therefore an interference relation is formed between the CAs. Therefore, this step may be understood as that the channel matrices reported by a UE having an interference relation are combined, and saved in a computation device corresponding to the UE.

Referring to FIG. 8, a BS 1, a BS 2, and a BS 3 collect channel matrices of UEs served respectively by the BS 1, the BS 2, and the BS 3, and save the channel matrices respectively on corresponding computation devices. In this embodiment, it is assumed that the computation devices are respectively $C_{11}$, $C_{12}$, and $C_{13}$, and the three computation devices are all located on Level 1 according to the foregoing principle.

A $UE_1$ and a $UE_5$ have the BS 1 and the BS 2 that provide services thereto, and therefore, the channel matrices collected by the BS 1 and the BS 2 and saved on the $C_{11}$ and the $C_{12}$ are combined and saved on another computation device; and in this embodiment, it is assumed that the device is $C_{21}$. Likely, a $UE_3$ have the BS 2 and the BS 3 that provide services thereto, and therefore the channel matrices collected by the BS 2 and the BS 3 and saved on the $C_{12}$ and the $C_{13}$ are combined and saved on another computation device; and in this embodiment, it is assumed that the device is $C_{22}$, and the $C_{22}$ and the $C_{21}$ are both located on Level 2.

It may be further known from FIG. 8 that, a $UE_2$ and a $UE_6$ each have the BS 1, the BS 2, and the BS 3 providing services thereto, and therefore the channel matrices collected by the BS 1, the BS 2, and the BS 3 and saved on the $C_{11}$, the $C_{12}$, and the $C_{13}$ are combined and saved on a new computation device; and in this embodiment, it is assumed that the device is $C_{31}$, and the device is located on Level 3.

After the saving the channel matrices is completed, some principles in a computation process are correspondingly introduced below.

As the $UE_1$ has the BS 1 and the BS 2 that provide services thereto, a channel matrix $H_1$ of the $UE_1$ may be expressed as $H_1=[H_{11}\ H_{21}]$; and correspondingly, the matrices of other UEs may be respectively expressed as $H_2=[H_{12}\ H_{22}\ H_{32}]$; $H_3=[H_{23}\ H_{33}]$; $H_4=[H_{34}]$; $H_5=[H_{15}\ H_{25}]$; and $H_6=[H_{16}\ H_{26}\ H_{36}]$, in which $H_{ij}$ represents a channel matrix of an $i^{th}$ BS to a $j^{th}$ UE.

It is assumed that pre-coding matrices of 6 UEs are respectively:

$$W_1 = \begin{bmatrix} W_{11} \\ W_{21} \end{bmatrix}; W_2 = \begin{bmatrix} W_{12} \\ W_{22} \\ W_{32} \end{bmatrix}; W_3 = \begin{bmatrix} W_{23} \\ W_{33} \end{bmatrix};$$

$$W_4 = [W_{34}]; W_5 = \begin{bmatrix} W_{15} \\ W_{25} \end{bmatrix}; \text{and } W_6 = \begin{bmatrix} W_{16} \\ W_{26} \\ W_{36} \end{bmatrix}.$$

in which, $W_{ij}$ represents a pre-coding matrix of an $i^{th}$ BS to a $j^{th}$ UE.

Referring to FIG. 8, as the BS 1 provides services respectively to the $UE_1$, the $UE_2$, the $UE_5$, and the $UE_6$, data information transmitted on a transmission antenna of the BS 1 is:

$$T_{BS1}=W_{11}b_1+W_{12}b_2+W_{15}b_5+W_{16}b_6$$

Correspondingly, data information transmitted on transmission antenna of the BS 2 and the BS 3 is respectively:

$$T_{BS2}=W_{21}b_1+W_{22}b_2+W_{23}b_3+W_{25}b_5+W_{26}b_6$$

$$T_{BS3}=W_{32}b_2+W_{33}b_3+W_{34}b_4+W_{36}b_6$$

in which, $b_i$ is data transmitted to an $i^{th}$ UE.

Data information received on a receiving antenna of each UE is respectively:

$$\begin{aligned}
y_1 &= H_{11}(W_{11}b_1 + W_{12}b_2 + W_{15}b_5 + W_{16}b_6) + \\
&\quad H_{21}(W_{21}b_1 + W_{22}b_2 + W_{23}b_3 + W_{25}b_5 + W_{26}b_6) + n_1 \\
&= [H_{11}W_{11} + H_{21}W_{21}]b_1 + [H_{11}W_{12} + H_{21}W_{22}]b_2 + H_{21}W_{23}b_3 + \\
&\quad [H_{11}W_{15} + H_{21}W_{25}]b_5 + [H_{11}W_{16} + H_{21}W_{26}]b_6 + n_1
\end{aligned}$$

$$\begin{aligned}
y_2 &= H_{12}(W_{11}b_1 + W_{12}b_2 + W_{15}b_5 + W_{16}b_6) + \\
&\quad H_{22}(W_{21}b_1 + W_{22}b_2 + W_{23}b_3 + W_{25}b_5 + W_{26}b_6) + \\
&\quad H_{32}(W_{32}b_2 + W_{33}b_3 + W_{34}b_4 + W_{36}b_6) + n_2 \\
&= [H_{12}W_{11} + H_{22}W_{21}]b_1 + [H_{12}W_{12} + H_{22}W_{22} + H_{32}W_{32}]b_2 + \\
&\quad [H_{22}W_{23} + H_{32}W_{33}]b_3 + H_{32}W_{34}b_4 + [H_{12}W_{15} + H_{22}W_{25}]b_5 + \\
&\quad [H_{12}W_{16} + H_{22}W_{26} + H_{32}W_{36}]b_6 + n_2
\end{aligned}$$

-continued $$\begin{aligned}
y_3 &= H_{23}(W_{21}b_1 + W_{22}b_2 + W_{23}b_3 + W_{25}b_5 + W_{26}b_6) + H_{33} \\
&\quad (W_{32}b_2 + W_{33}b_3 + W_{34}b_4 + W_{36}b_6) + n_3 \\
&= H_{23}W_{21}b_1 + [H_{23}W_{22} + H_{33}W_{32}]b_2 + [H_{23}W_{23} + H_{33}W_{33}]b_3 + \\
&\quad H_{33}W_{34}b_4 + H_{23}W_{25}b_5 + [H_{23}W_{26} + H_{33}W_{36}]b_6 + n_3
\end{aligned}$$

$$\begin{aligned}
y_4 &= H_{34}(W_{32}b_2 + W_{33}b_3 + W_{34}b_4 + W_{36}b_6) + n_4 \\
&= H_{34}W_{32}b_2 + H_{34}W_{33}b_3 + H_{34}W_{34}b_4 + H_{34}W_{36}b_6 + n_4
\end{aligned}$$

$$\begin{aligned}
y_5 &= H_{15}(W_{11}b_1 + W_{12}b_2 + W_{15}b_5 + W_{16}b_6) + H_{25}(W_{21}b_1 + \\
&\quad W_{22}b_2 + W_{23}b_3 + W_{25}b_5 + W_{26}b_6) + n_5 \\
&= [H_{15}W_{11} + H_{25}W_{21}]b_1 + [H_{15}W_{12} + H_{25}W_{22}]b_2 + H_{25}W_{23}b_3 + \\
&\quad [H_{15}W_{15} + H_{25}W_{25}]b_5 + [H_{15}W_{16} + H_{25}W_{26}]b_6 + n_5
\end{aligned}$$

$$\begin{aligned}
y_6 &= H_{16}(W_{11}b_1 + W_{12}b_2 + W_{15}b_5 + W_{16}b_6) + H_{26}(W_{21}b_1 + \\
&\quad W_{22}b_2 + W_{23}b_3 + W_{25}b_5 + W_{26}b_6) + \\
&\quad H_{36}(W_{32}b_2 + W_{33}b_3 + W_{34}b_4 + W_{36}b_6) + n_6 \\
&= [H_{16}W_{11} + H_{26}W_{21}]b_1 + [H_{16}W_{12} + H_{26}W_{22} + H_{36}W_{32}]b_2 + \\
&\quad [H_{26}W_{23} + H_{36}W_{33}]b_3 + H_{36}W_{34}b_4 + [H_{16}W_{15} + H_{26}W_{25}]b_5 + \\
&\quad [H_{16}W_{16} + H_{26}W_{26} + H_{36}W_{36}]b_6 + n_6
\end{aligned}$$

in which, $n_i$ ($i=1\sim6$) represents an additive white Gaussian noise of $UE_i$.

In order to completely eliminate the interference between different UEs in a network, a condition should be met, that a product of pre-coding matrices of a certain UE and other UEs served by a BS providing services for the UE is 0. With the $UE_1$ as shown in FIG. 8 as an example, the $UE_1$ has the BS 1 and the BS 2 providing services thereto, and at a certain time, the BS 1 further provides service to the $UE_2$, the $UE_5$, and the $UE_6$, and the BS 2 further provides service to the $UE_2$, the $UE_3$, the $UE_5$, and the $UE_6$, and therefore, if it intends to prevent $UE_1$ from interference of other UEs in the network, a condition should be met, that a product of the channel matrices reported by the $UE_1$ and pre-coding matrices of the $UE_2$, the $UE_3$, the $UE_5$, and the $UE_6$ is 0, that is:

$$\begin{cases} H_{11}W_{12} + H_{21}W_{22} = 0 \\ H_{21}W_{23} = 0 \\ H_{11}W_{15} + H_{21}W_{25} = 0 \\ H_{11}W_{16} + H_{21}W_{26} = 0 \end{cases}$$

The processing of other UEs is similar to that of the $UE_1$, and therefore is not described respectively. The UEs are known, and what needs to be solved is the pre-coding matrix of each UE, so constraint equations needed to be met by the pre-coding matrix of each UE are listed.

The pre-coding matrix ($W_{11}$, $W_{21}$) of the $UE_1$ should meet:

$$\begin{cases} H_{12}W_{11} + H_{22}W_{21} = 0 \\ H_{23}W_{21} = 0 \\ H_{15}W_{11} + H_{25}W_{21} = 0 \\ H_{16}W_{11} + H_{26}W_{21} = 0 \end{cases}.$$

The pre-coding matrix ($W_{12}$, $W_{22}$, $W_{32}$) of the $UE_2$ should meet:

$$\begin{cases} H_{11}W_{12} + H_{21}W_{22} & = 0 \\ H_{23}W_{22} + H_{33}W_{32} & = 0 \\ H_{34}W_{32} & = 0 \\ H_{15}W_{12} + H_{25}W_{22} & = 0 \\ H_{16}W_{12} + H_{26}W_{22} + H_{36}W_{32} & = 0 \end{cases}.$$

The pre-coding matrix ($W_{23}$, $W_{33}$) of the $UE_3$ should meet:

$$\begin{cases} H_{21}W_{23} & = 0 \\ H_{22}W_{23} + H_{32}W_{33} & = 0 \\ H_{34}W_{33} & = 0 \\ H_{25}W_{23} & = 0 \\ H_{26}W_{23} + H_{36}W_{33} & = 0 \end{cases}.$$

The pre-coding matrix ($W_{34}$) of the $UE_4$ should meet:

$$\begin{cases} H_{32}W_{34} & = 0 \\ H_{33}W_{34} & = 0 \\ H_{36}W_{34} & = 0 \end{cases}.$$

The pre-coding matrix ($W_{15}$, $W_{25}$) of the $UE_5$ should meet:

$$\begin{cases} H_{11}W_{15} + H_{21}W_{25} & = 0 \\ H_{23}W_{25} & = 0 \\ H_{12}W_{15} + H_{22}W_{25} & = 0 \\ H_{16}W_{15} + H_{26}W_{25} & = 0 \end{cases}.$$

The pre-coding matrix ($W_{16}$, $W_{26}$, $W_{36}$) of the $UE_6$ should meet:

$$\begin{cases} H_{11}W_{16} + H_{21}W_{26} & = 0 \\ H_{23}W_{26} + H_{33}W_{36} & = 0 \\ H_{34}W_{36} & = 0 \\ H_{15}W_{16} + H_{25}W_{26} & = 0 \\ H_{12}W_{16} + H_{22}W_{26} + H_{32}W_{36} & = 0 \end{cases}.$$

According to the principle of solving pre-coding, as for the solving of the pre-coding matrix ($W_{11}$, $W_{21}$) of the $UE_1$, a channel matrix needed to be input is ($H_{12}$, $H_{22}$, $H_{23}$, $H_{15}$, $H_{25}$, $H_{16}$, $H_{26}$). It is stated above that, the $UE_1$ and the $UE_5$ all have the BS 1 and the BS 2 that provide services thereto, so the $UE_1$ and the $UE_5$ need to report the channel matrices to the BS 1 and the BS 2, and all the channel matrices collected by the BS 1 and the BS 2 are combined and saved on the computation device $C_{21}$ located on Level 2, the computation tasks of the $UE_1$ and the $UE_5$ are assigned to the computation device $C_{21}$. Likewise, the $UE_3$ has the BS 2 and the BS 3 that provide services thereto, and the channel matrices collected by the BS 2 and the BS 3 are combined and saved on the computation device $C_{22}$ located on Level 2, so that the computation task of the $UE_3$ is assigned to the computation device $C_{22}$. Correspondingly, the computation task of the $UE_4$ is assigned to the computation device $C_{13}$ located on Level 1, and the computation tasks of the $UE_2$ and the $UE_6$ are assigned to the computation device $C_{31}$ located on Level 3.

So far, the pre-coding computation tasks of all UEs in the network are allocated to different computation devices, and complete decoupling of the computation task on each computation device is achieved, and then step 706 is performed.

Step 706: Each computation device performs pre-coding computation of a corresponding UE.

As the computation tasks of different UEs are allocated to different computation devices, in this step, the computation by each computation device may be performed in parallel, so that the timeliness of the computation task is correspondingly ensured.

In step 706, in order to reduce computation repetition, the following manner may be employed.

Considering that the constraint equations met by the pre-coding matrices of different UEs on the same computation device are partially identical, taking the $UE_1$ and the $UE_5$ as examples, it is mentioned that the pre-coding matrix of the $UE_1$ needs to meet:

$$\begin{cases} H_{12}W_{11} + H_{22}W_{21} & = 0 \\ H_{23}W_{21} & = 0 \\ H_{15}W_{11} + H_{25}W_{21} & = 0 \\ H_{16}W_{11} + H_{26}W_{21} & = 0 \end{cases},$$

and
the pre-coding matrix of $UE_5$ needs to meet:

$$\begin{cases} H_{11}W_{15} + H_{21}W_{25} & = 0 \\ H_{23}W_{25} & = 0 \\ H_{12}W_{15} + H_{22}W_{25} & = 0 \\ H_{16}W_{15} + H_{26}W_{25} & = 0 \end{cases}$$

It may be known that, the sets of constraint equations of the pre-coding matrices of the $UE_1$ and the $UE_5$ have three identical constraint equations, that is:

$$\begin{cases} H_{12}W_{1k} + H_{22}W_{2k} & = 0 \\ H_{23}W_{2k} & = 0 \\ H_{16}W_{1k} + H_{26}W_{2k} & = 0 \end{cases} \tag{1}$$

in which, ($W_{1k}$, $W_{2k}$) is a pre-coding matrix to be solved. Therefore, in the computation process, a solution space meeting the equation set (1) may be solved first, and shared, and the pre-coding computation of the $UE_1$ and the $UE_5$ is performed based on the solution space, and therefore, the workload of the computation task may be effectively reduced.

Step 707: Each computation device sends a computation result to a BS corresponding to a relevant UE.

After receiving pre-coding computation results of different UEs sent by computation devices, a BS may further perform the following operations.

Step 708: Determined whether the CA to which a UE belongs needs to be updated, if the determination result is yes, step 702 is performed again; otherwise, step 709 is performed.

In step 708, the UE is mobile, and may move out of the CA to which it originally belongs, in this case, a CA to which the UE belongs needs to be re-determined, that is, step 702 is performed again.

Step 709: Determined whether the channel matrices reported by the UE need to be updated.

In step 709, the UE is mobile, so certain changes may exist in the channel matrices reported by the UE to a corresponding BS, and the changes undoubtedly influences the ultimate computation result, if the determination result is yes, step 703 is performed again; otherwise, the BS sends data information to a corresponding UE by using the received pre-coding values sent by computation devices, so as to achieve interference free between each UE.

In this embodiment, the UE may be understood as a terminal device providing mobile communication services for a user. The common UE may be a mobile phone, a bleeper, a computer or a notebook wirelessly connected to a network, a PDA, a WiFi terminal, or a WiMax terminal. Definitely, the UE may also be a satellite localizer, an information query device, or the like.

Persons skilled in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read-Only Memory (ROM), a Random Access Memory (RAM), a magnetic disk, or an optical disk.

Persons skilled in the art may implement or use the present invention through the descriptions of the embodiments disclosed. Modifications to the embodiments are apparent to those skilled in the art, and the general principles as defined herein may be implemented in other embodiments without departing from the spirit and scope of the present invention. Therefore, the present invention is not limited to the embodiments disclosed herein, but falls in a widest scope in agreement with the principles and novel features as disclosed herein.

What is claimed is:

1. A pre-processing method for cooperative communication, comprising:
   obtaining Multiple-Input Multiple-Output (MIMO) Cooperation Area (CA) information, wherein the MIMO CA information comprises a corresponding relation between the Base Stations (BSs) and User Equipments (UEs) served by the BSs in the MIMO CA, where the UEs include at least a first UE and a second UE;
   obtaining all channel matrices of the first and the second UEs, wherein each BS serving each of the first and the second UEs reports channel matrices between the UE and itself;
   combining the channel matrices of the first and the second UEs according to the corresponding relation between the BSs and the UE;
   saving the combined channel matrices of the first UE to a first computation device;
   saving the combined channel matrices of the second UE to a second computation device;
   saving the combined channel matrices of the first and the second UEs to a select computation device, wherein the select computation device is one of: the first computation device, the second computation device, or another computation device;
   scheduling the select computation device to perform a pre-coding computation process using the saved combined channel matrices;
   scheduling each of the first and the second computation devices to receive a common solution space and to perform a pre-coding computation of its corresponding UE using the common solution space; and
   scheduling transmission of the computation results to the serving BSs of the first and the second UEs.

2. The method according to claim 1, wherein the combining the channel matrices of the first and the second UEs according to the corresponding relation between the BS and the UE comprises:
   obtaining the channel matrices sent by the BSs and reported by the UEs served by the BSs;
   combining the channel matrices collected by all BSs serving the UE according to the corresponding relation between the BSs and the UEs, when interference exists between the MIMO CAs; and
   sending the combined channel matrices to the computation device corresponding to the UE.

3. The method according to claim 1, wherein the combining the channel matrices of the first and the second UEs according to the corresponding relation between the BS and the UE comprises:
   scheduling all BSs serving an interferenced UE according to the corresponding relation between the BS and the UE; and
   sending the collected channel matrices to the computation device corresponding to the UE for combination, when interference exists between the MIMO CAs.

4. A pre-processing system for cooperative communication, comprising:
   a task decomposition and scheduling apparatus, wherein the task decomposition and scheduling apparatus, comprises:
   an obtaining unit configured to:
   obtain Multiple-Input Multiple-Output (MIMO) Cooperation Area (CA) information, in which the MIMO CA information includes a corresponding relation between the Base Stations (BSs) and User Equipments (UEs) served by the BSs in the MIMO CA, where the UEs include at least a first UE and a second UE; and
   obtain all channel matrices of the first and the second UEs, wherein each BS serving each of the first and the second UEs reports channel matrices between the UE and itself;
   a task decomposition unit configured to:
   combine the channel matrices of the first and the second UEs according to the corresponding relation between the BSs and the UE;
   save the combined channel matrices of the first UE to a first computation device;
   save the combined channel matrices of the second UE to a second computation device; and
   save the combined channel matrices of the first and the second UEs to a select computation device, wherein the select computation device is one of: the first computation device, the second computation device, or another computation device; and
   a task scheduling unit configured to:
   schedule the select computation device to perform a pre-coding computation process using the saved combined channel matrices;
   schedule each of the first and the second computation devices to receive a common solution space and to perform a pre-coding computation of its corresponding UE using the common solution space; and
   schedule transmission of the computation results to the serving BSs of the first and the second UEs.

5. The system according to claim 4, wherein the task decomposition unit is further configured to combine channel matrices collected by all BSs serving a certain UE according to the corresponding relation between the BS and the UE, and send the combined channel matrices to a corresponding computation device, when interference exists between the MEMO CAs.

6. The system according to claim 4, wherein the task decomposition unit is further configured to notify the task scheduling unit to schedule all the BS serving a certain UE according to the corresponding relation between the BS and the UE, and send the collected channel matrices to a computation device for combination.

7. The system according to claim 4, wherein the task scheduling unit is further configured to schedule the computation device to return a computation result to a BS providing services to the UE after the computation device completes pre-coding computation of the UE.

8. The system according to claim 4, further comprising a computation device configured to perform pre-coding computation of the UE by using the combined channel matrices, according to the scheduling of the task decomposition and scheduling apparatus.

9. A pre-processing method for cooperative communication, comprising:
obtaining, by a task decomposition and scheduling apparatus, Multiple-Input Multiple-Output (MIMO) Cooperation Area (CA) information, wherein the MIMO CA information comprises a corresponding relation between the Base Stations (BSs) and User Equipments (UEs) served by the BSs in the MIMO CA, where the UEs include at least a first UE and a second UE;
obtaining, by the task decomposition and scheduling apparatus, all channel matrices of the first and the second UEs, wherein each BS serving each of the first and the second UEs reports channel matrices between the UE and itself;
combining, by the task decomposition and scheduling apparatus, the channel matrices of the first and the second UEs according to the corresponding relation between the BSs and the UE;
saving the combined channel matrices of the first UE to a first computation device;
saving the combined channel matrices of the second UE to a second computation device;
saving the combined channel matrices of the first and the second UEs to a select computation device, wherein the select computation device is one of: the first computation device, the second computation device, or another computation device;
scheduling the select computation device to perform a pre-coding computation process using the saved combined channel matrices;
scheduling each of the first and the second computation devices to receive a common solution space and to perform a pre-coding computation of its corresponding UE using the common solution space; and
scheduling transmission of the computation results to the serving BSs of the first and the second UEs.

10. The method according to claim 9, wherein the combining the channel matrices of the first and the second UEs according to the corresponding relation between the BS and the UE comprises: obtaining the channel matrices sent by the BSs and reported by the UEs served by the BSs; combining the channel matrices collected by all BSs serving the UE according to the corresponding relation between the BSs and the UEs, when interference exists between the MIMO CAs; and sending the combined channel matrices to the computation device corresponding to the UE.

11. The method according to claim 9, wherein the combining the channel matrices of the first and the second UEs according to the corresponding relation between the BS and the UE comprises:
scheduling all BSs serving an interferenced UE according to the corresponding relation between the BS and the UE; and
sending the collected channel matrices to the computation device corresponding to the UE for combination, when interference exists between the MIMO CAs.

12. A pre-processing system for cooperative communication, comprising:
a task decomposition and scheduling apparatus, and
a computation device,
wherein the task decomposition and scheduling apparatus comprises:
an obtaining unit configured to:
obtain Multiple-Input Multiple-Output (MIMO) Cooperation Area (CA) information, in which the MIMO CA information includes a corresponding relation between the Base Stations (BSs) and User Equipments (UEs) served by the BSs in the MIMO CA, where the UEs include at least a first UE and a second UE; and
obtain all channel matrices of the first and the second UEs, wherein each BS serving each of the first and the second UEs reports channel matrices between the UE and itself;
a task decomposition unit configured to:
combine the channel matrices of the first and the second UEs according to the corresponding relation between the BSs and the UE;
save the combined channel matrices of the first UE to a first computation device;
save the combined channel matrices of the second UE to a second computation device; and
save the combined channel matrices of the first and the second UEs to a select computation device, wherein the select computation device is one of: the first computation device, the second computation device, or another computation device; a task scheduling unit configured to:
schedule the select computation device to perform a pre-coding computation process using the saved combined channel matrices;
schedule each of the first and the second computation devices to receive a common solution space and to perform a pre-coding computation of its corresponding UE using the common solution space; and
schedule transmission of the computation results to the serving BSs of the first and the second UEs, and
wherein the computation device, comprises:
a receiving unit configured to receive the combine channel matrices of the UE;
a computation unit configured to perform pre-coding computation of the UE by using the combined channel matrices according to the scheduling of the task decomposition and scheduling apparatus; and
a sending unit configured to send separately a pre-coding result according to the scheduling of the task scheduling unit.

13. The system according to claim 12, wherein the task decomposition unit is further configured to combine channel matrices collected by all BSs serving a certain UE according to the corresponding relation between the BSs and the UE, and send the combined channel matrices to the computation device, when interference exists between the MIMO CAs.

14. The system according to claim 12, wherein the task decomposition unit is further configured to notify the task scheduling unit to schedule all the BSs serving a certain UE according to the corresponding relation between the BSs and the UE, and send the collected channel matrices to the computation device for combination, and wherein the receiving unit is further configured to receive and combine channel matrices of the UE.

\* \* \* \* \*